(12) United States Patent
Berry

(10) Patent No.: US 9,101,152 B2
(45) Date of Patent: Aug. 11, 2015

(54) FLOSS BOWL

(71) Applicant: Gold Medal Products Company, Cincinnati, OH (US)

(72) Inventor: Michael James Berry, Burlington, KY (US)

(73) Assignee: Gold Medal Products Company, Cincinnati, OH (US)

( * ) Notice: Subject to any disclaimer, the term of this patent is extended or adjusted under 35 U.S.C. 154(b) by 148 days.

(21) Appl. No.: 13/921,564

(22) Filed: Jun. 19, 2013

(65) Prior Publication Data

US 2014/0377425 A1 Dec. 25, 2014

(51) Int. Cl.
*A47J 43/046* (2006.01)
*A23G 3/10* (2006.01)
*A23G 3/34* (2006.01)

(52) U.S. Cl.
CPC ............... *A23G 3/10* (2013.01); *A23G 3/0051* (2013.01)

(58) Field of Classification Search
CPC ....... A23G 3/10; A23G 3/0051; A01B 12/006
USPC ............ 426/515; 425/9; 220/4.21–4.33, 6
See application file for complete search history.

(56) References Cited

U.S. PATENT DOCUMENTS

| | | | | |
|---|---|---|---|---|
| 889,899 | A * | 6/1908 | Smith | 249/171 |
| 2,334,805 | A * | 11/1943 | Barbieri | 229/4.5 |
| 2,367,448 | A * | 1/1945 | Thiele | 99/409 |
| 2,575,069 | A * | 11/1951 | Rankin et al. | 220/4.28 |
| 2,998,002 | A * | 8/1961 | Standig | 126/25 A |
| 3,019,745 | A * | 2/1962 | Du Bois et al. | 425/9 |
| 3,118,396 | A * | 1/1964 | Brown et al. | 425/9 |
| 3,179,277 | A * | 4/1965 | Olson et al. | 220/4.03 |
| 3,336,607 | A * | 8/1967 | Weisman et al. | 5/99.1 |
| 3,358,673 | A * | 12/1967 | Rocke | 126/152 R |
| 4,501,538 | A * | 2/1985 | Bray et al. | 425/9 |
| 4,846,643 | A * | 7/1989 | Yamamoto et al. | 425/7 |
| 5,253,801 | A * | 10/1993 | Bernstein et al. | 229/113 |
| 5,359,809 | A * | 11/1994 | Johnson | 47/73 |
| 7,896,183 | B2 * | 3/2011 | McKenzie | 220/4.34 |
| 2001/0019056 | A1 * | 9/2001 | Rosenfeldt | 220/7 |
| 2002/0008517 | A1 * | 1/2002 | Derby et al. | 324/318 |

* cited by examiner

*Primary Examiner* — Steven Leff
(74) *Attorney, Agent, or Firm* — Wood, Herron & Evans, LLP

(57) ABSTRACT

A floss bowl is formed from a plurality of tapered, nestable segments which can be coupled together in a bowl configuration for use on a cotton candy machine. The segments can be disassembled for cleaning, or can be nested for storage or shipment. Methods are disclosed.

10 Claims, 6 Drawing Sheets

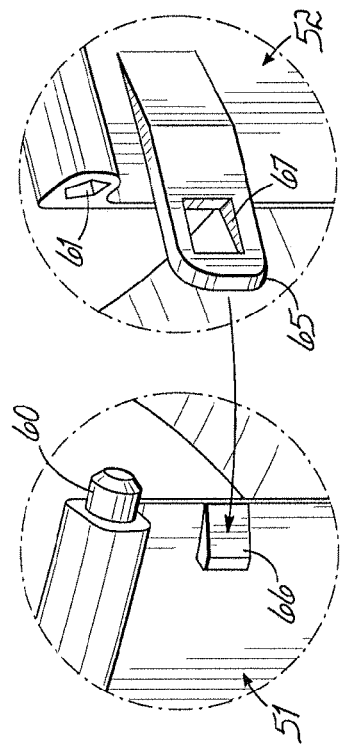
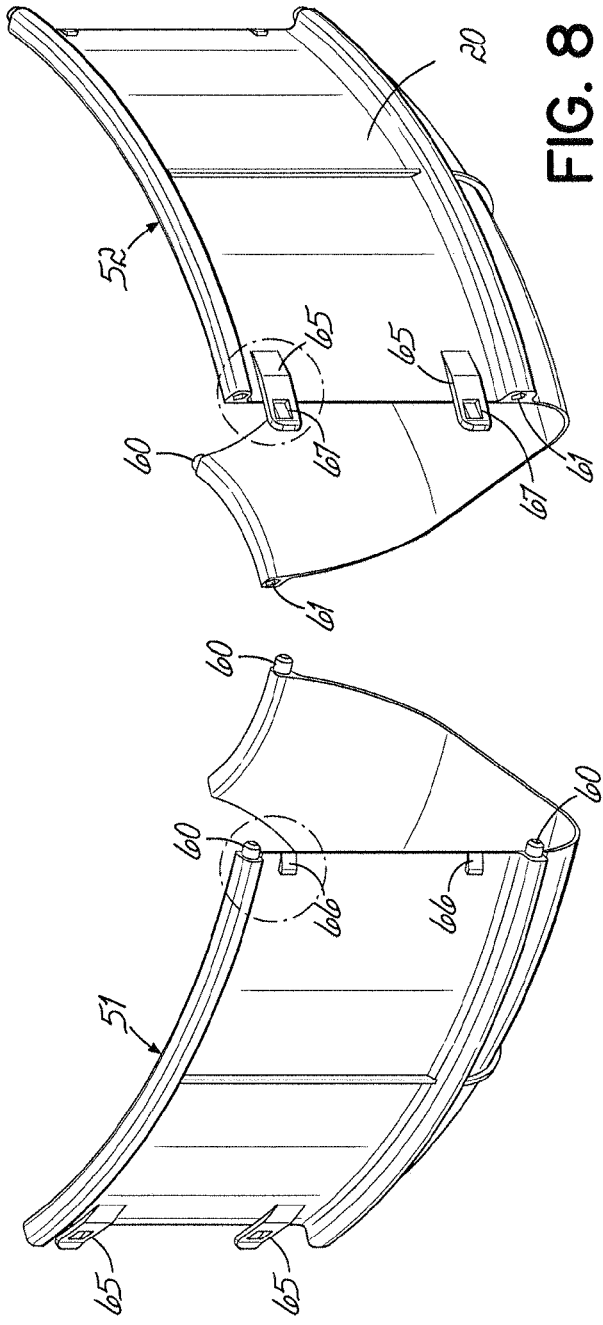

FLOSS BOWL

FIELD OF THE INVENTION

This invention relates to cotton candy making apparatus and particularly to floss bowls used in cotton candy filament spinning apparatus.

BACKGROUND OF THE INVENTION

In cotton candy making, it is known to supply sugar to a heated spinning head located centrally and within an open cotton candy bowl. The heated head melts the sugar granules and spins the molten sugar out of the head, in the form of filaments, into the bowl. The filaments are collected as floss in the bowl and are traditionally picked up on a paper cone in the form of a cloud or fluffy collection of cotton candy for human consumption.

Such floss catching bowls are traditionally of monolithic, one piece construction of metal or plastic. In diameter, the bowls are large, measuring 26 inches or more in diameter.

When cotton candy machines and bowls are made and shipped together, or when bowls themselves are stored or shipped alone, they constitute large objects, light in weight, for the displacement of their size or volume. Such bowls take up more space than their weight in smaller objects would require, resulting in increased costs of storage space or shipping charges. Said in another way, the storage or shipping volumes required are very large for the actual weight of the bowls.

Accordingly, it is objective of the invention to provide a bowl for cotton candy machines wherein the bowl does not take up or occupy the volume of space required for same size bowls in the past.

In addition, the large monolithic bowls of the past are difficult to clean since their size makes them unwieldy.

It is thus another objective of the invention to provide an improved cotton candy floss bowl which is easy to handle and clean without the unwieldiness of prior bowls.

SUMMARY OF THE INVENTION

To these ends, a cotton candy floss bowl in a preferred embodiment comprises a bowl for catching cotton candy filaments spun from a heated rotating head wherein the bowl itself is not of the traditional, one-piece construction but, instead, is comprised of a plurality of connectible segments, connected to define a bowl of desired dimension but separable, in segments, which can be stacked or nested for storage or shipping or individually handled for cleaning. In nested configuration, a plurality of segments for making up one bowl requires but a fraction of volume or space compared to that of the assembled bowl. Segments for many bowls can be nested into smaller volumes of space, such that components of many bowls can be stored or shipped in the space previously required for a much smaller number of bowls.

In addition, a bowl formed from a plurality of specimens can be disassembled into discrete segments for easy cleaning thereof separately from the others and without the unwieldiness of prior one-piece bowls.

Preferably each segment is provided on its edges with snap-together components so the segments are easily, but permanently or removeably snapped together for use as a cotton candy bowl, and unsnapped and separated for cleaning, or for storage or shipping in relatively smaller, higher weight volumes than prior one-piece bowls.

These and other objectives and advantages will become readily apparent from the following detailed written description and from the drawings in which:

BRIEF DESCRIPTION OF THE DRAWINGS

FIG. 7 is an exploded view of the upper edges of two segments of the bowl of FIG. 6; and FIG. 8 is an exploded view of the embodiment of FIG. 6 illustrating the joinder of two bowl segments.

DETAILED DESCRIPTION OF THE INVENTION

Figure 1:
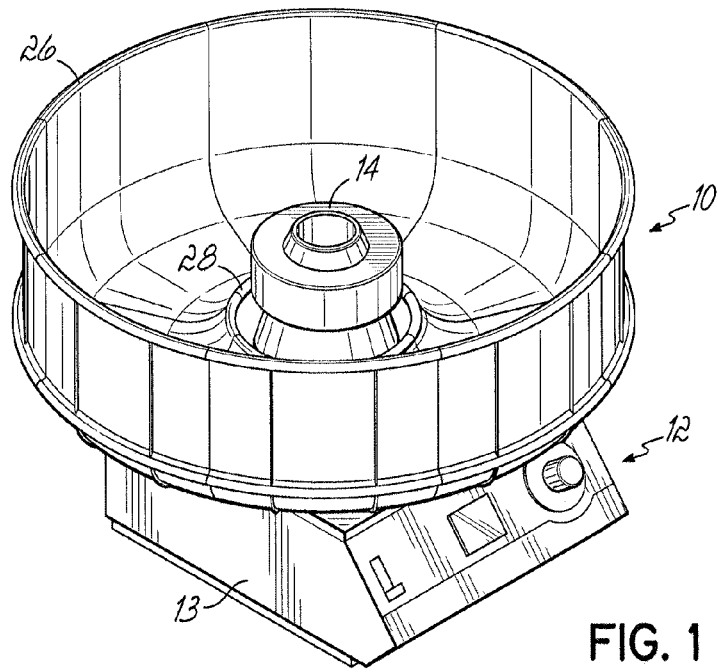
FIG. 1 is an illustrative isometric view of a cotton candy machine fitted with a floss bowl according to the invention.

Turning now to the FIGS., like numerals will designate like parts in the respective segments. FIG. 1 illustrates a snap-together, segmented floss bowl 10 of the invention in operative position on a cotton candy machine 12 comprising a base 13 and heated rotatable spinner head 14.

Machine 12, including base 13 and head 14 is of any suitable construction as is well known.

In use, sugar is deposited in head 14 which is heated. When head 14 is rotated or spun, the sugar is melted and spun from the head as elongated filaments of molten sugar, collecting in bowl 10. From there, the filaments can be accumulated on a paper cone, as is well-known in the art.

Figure 2:
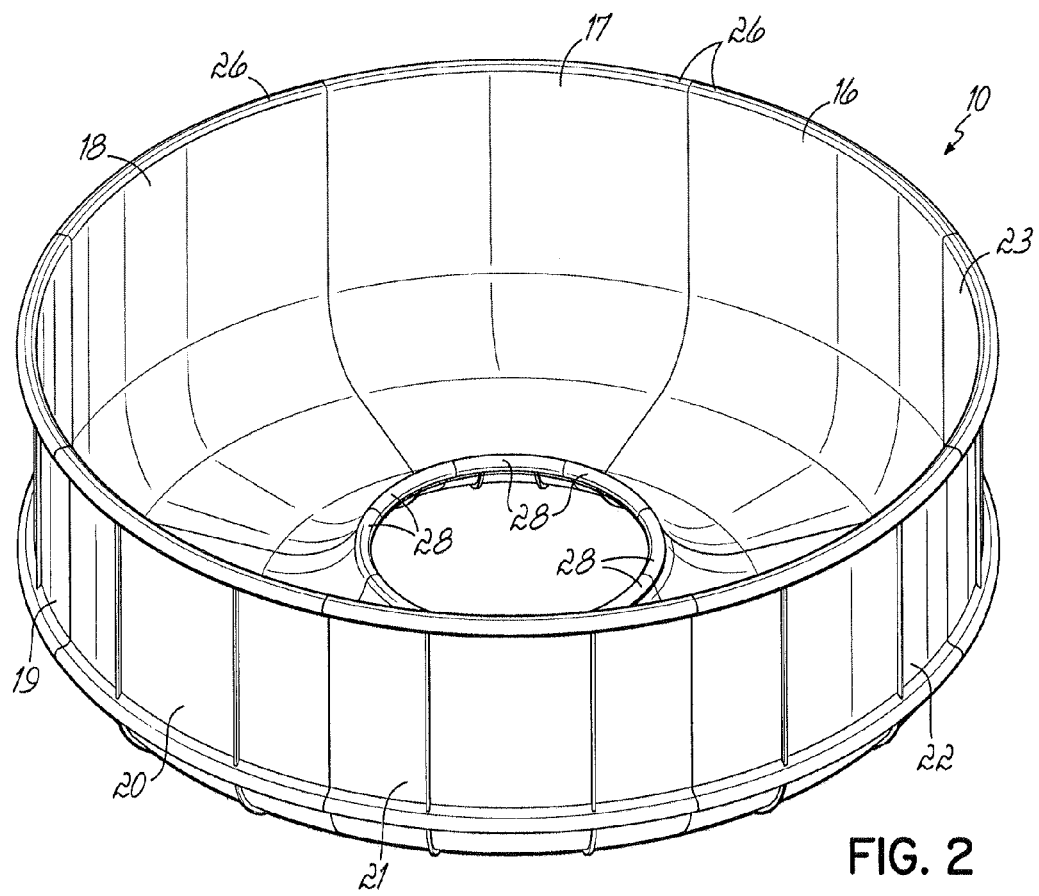
FIG. 2 is an isometric view of a floss bowl of the invention as in FIG. 1.
Figure 3:
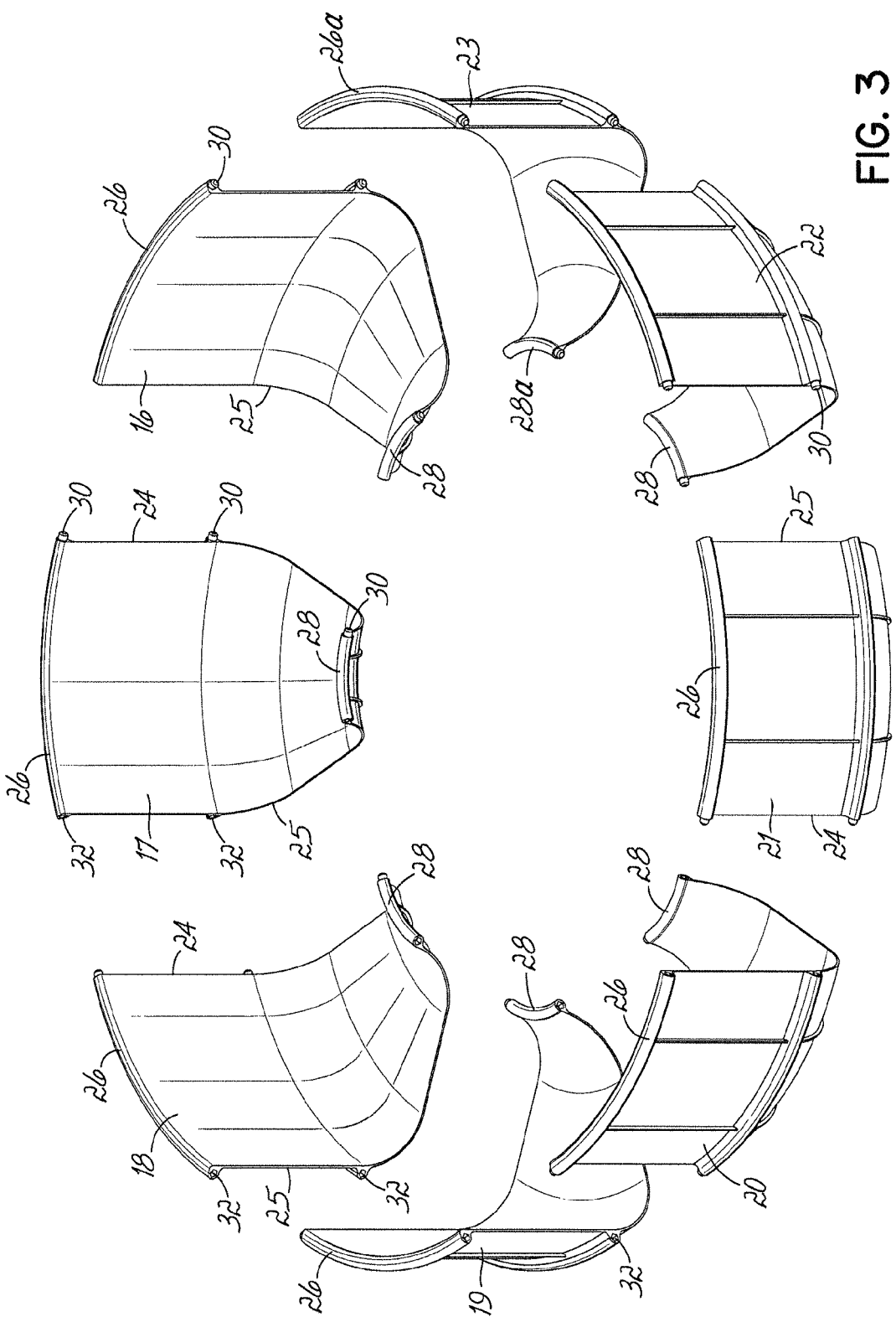
FIG. 3 is an exploded isometric view of the floss bowl of FIGS. 1 and 2.

Turning now to FIG. 2, it will be appreciated that bowl 10 is not a single piece, unitary bowl as in the past but, rather, is a composite bowl comprising a plurality of segments, in this embodiment, eight segments 16-23.

Each segment has an upper curved, peripheral rim 26 developed with one radius and a lower peripheral rim 28 developed with a lesser radius. When joined together, rims 26 of segments 16-23 define a circular mouth of bowl 10. And lower rims 28 form an opening to accommodate head 14 and other components of machine 12.

Figure 4:
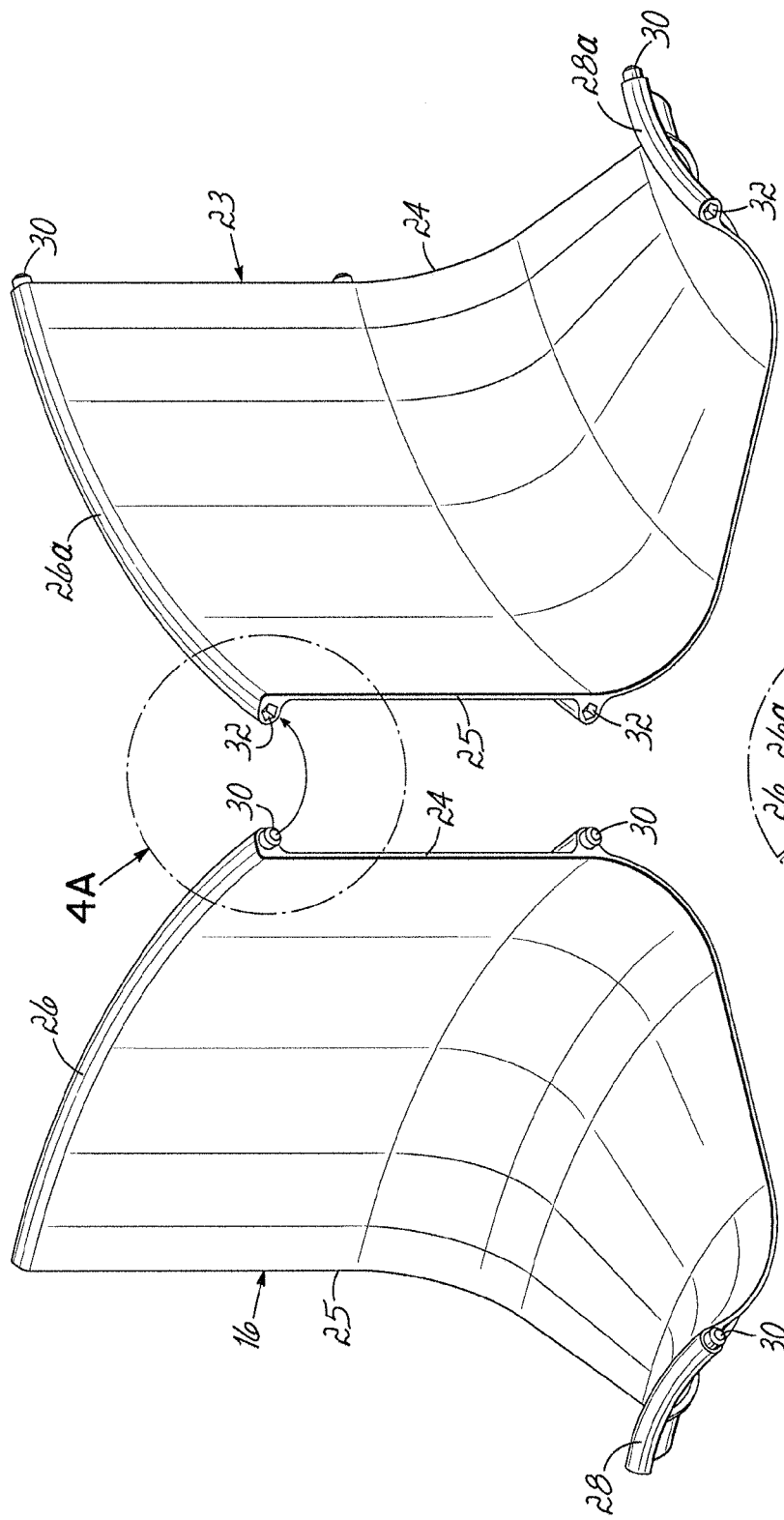
FIG. 4 is an isometric view of two segments of the floss bowl of FIG. 3, illustrating the interconnecting details of the two segments.
Figure 4A:
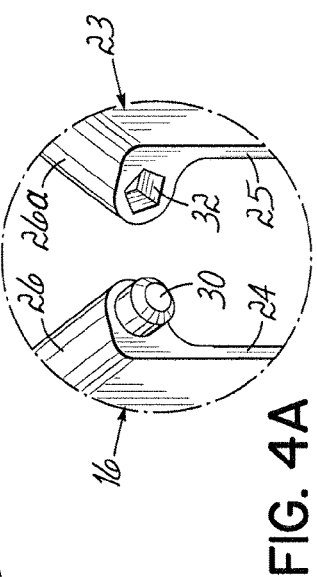
FIG. 4A is an enlarged view of the encircled area 4A of FIG. 4.

With reference to FIGS. 4 and 4A, two segments 16 and 23 are illustrated; these being typical of the other segments. Segment 16 has respective upper and lower rims 26, 28, while segment 23 has respective upper and lower rims 26a and 28a of similar construction to their relative counterparts 26 and 28.

As depicted most clearly in FIG. 4A, rim 26 at one edge of segment 16 is provided with an extended projection or connector 30. At an opposite edge of each segment, such as segment 23, rim 26a is provided with a cavity 32 for receiving in preferably a friction, press or snap-fit cooperation the projection 30.

Likewise, lower rim 28 segment 16 is provided with a projection 30 while lower rim 28a is provided with a cavity 32; these two components cooperating to releasably hold the segments 16, 23 together when their respective edges 24, 25 are pushed together so that rims 26, 26a and 28, 28a define the respective circular openings noted above and as shown in FIG. 2.

Additional and complimentary projections 30 and cavities 32 are oriented in cooperating position along the edges 24, 25 of segments 16, 23 as shown in FIG. 4.

Preferably each segment 16-23 is of similar construction, each having cavities 32 along one edge 25 and projections along opposite edges 24 so that all eight segments can be fitted together, respective edges 24, 25 of the segments are abutted with the projections and cavities formed in a way or configuration to snap the segments together, the interface of projection 30 to cavity 32 defining a friction, press or snap fit sufficient to hold the segments 16-23 together in an operable bowl configuration, but rendering the segments separable for nesting, storage, shipping or cleaning. Alternately, the fit of the projections and cavities could be such as to permanently connect the segments together.

Any suitable releasable and cooperating connector components can be used to align and/or secure the segments together to define a bowl.

Figure 5:
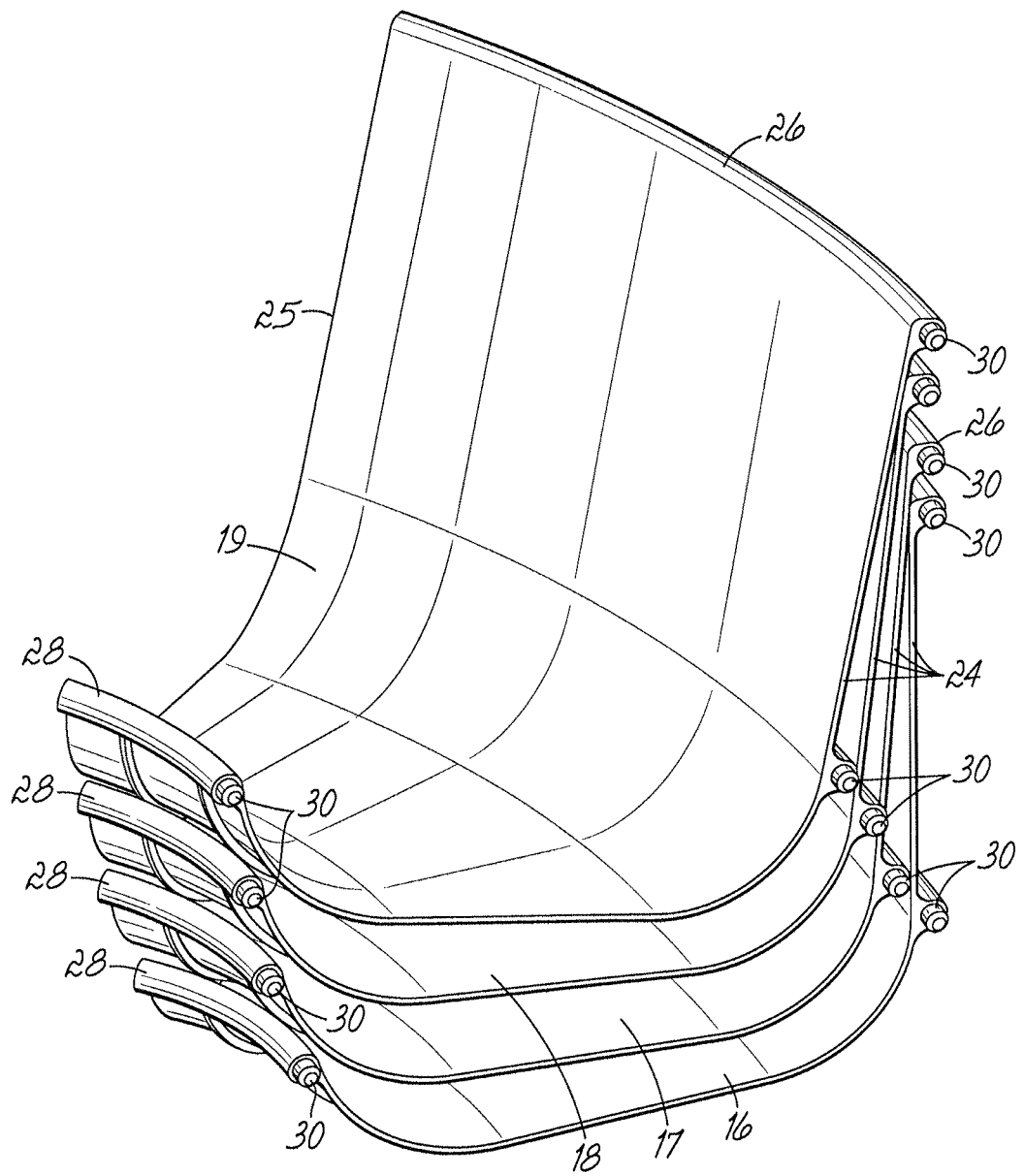
FIG. 5 is an isometric view showing segments of a floss bowl according to the invention in nested orientation, such as for storage or shipment.

One configuration of four nesting segments 16-19 is illustrated in FIG. 5. Four segments are illustrated, but it will be appreciated that fewer or more segments could be so nested for storage, shipping or the like. Eight so nested segments would occupy much less space or volume than a one piece bowl of similar final bowl dimension.

It will be appreciated that in one embodiment as shown, each segment is essentially identical to each other segment. Different shaped segments might be used to produce different bowl shapes.

Other connectors could be used to secure the segments together in a bowl shape.

The bowl shape as shown in FIGS. 1 and 2 can be simply fitted to any cotton candy machine, the machine drive extending through to opening defined by lower rims 28 and the spinner head located above the bowl bottom but within the bowl for capture by the bowl of the spun filament. The bowl 10 can rest on machine 12 or secured in suitable manner to base 13.

Segments 16-23 are preferably of tapered shape, as portions of the annular bowl 10, the segment width being narrower near rim 28 than near top rim 26. See FIGS. 4 and 5 where the segments are wider at the outer top ends than at their inner lower ends.

Each segment 16-23 has an upstanding wider portion proximate rim 26 to define an outer bowl wall, and another upstanding narrower inner portion nearer rim 28 to define a shorter inner bowl wall.

Segments 16-23 may be made of any suitable material including metal, aluminum and synthetic materials like various plastics. The inner surface of the segments may be embossed, formed irregular surfaces or the like to enhance accumulation and collection of cotton candy filaments or floss. Also, features may be added to the segments to provide mounting of mesh or other components to the same end.

Moreover, a various number of segments from two to more than eight, can be used to form a complete bowl, as desired.

Alternately, the segments may be positioned or connected together by cooperating components such as latches, encircling belts or straps, components mounted on outer surfaces thereof, or any suitable such means for holding the segments together in a bowl configuration for use. For example, complimentary features on the segments for operatively positioning them together, and in combination with latches, encircling belts or straps or other suitable expedients may be used.

Figure 6:
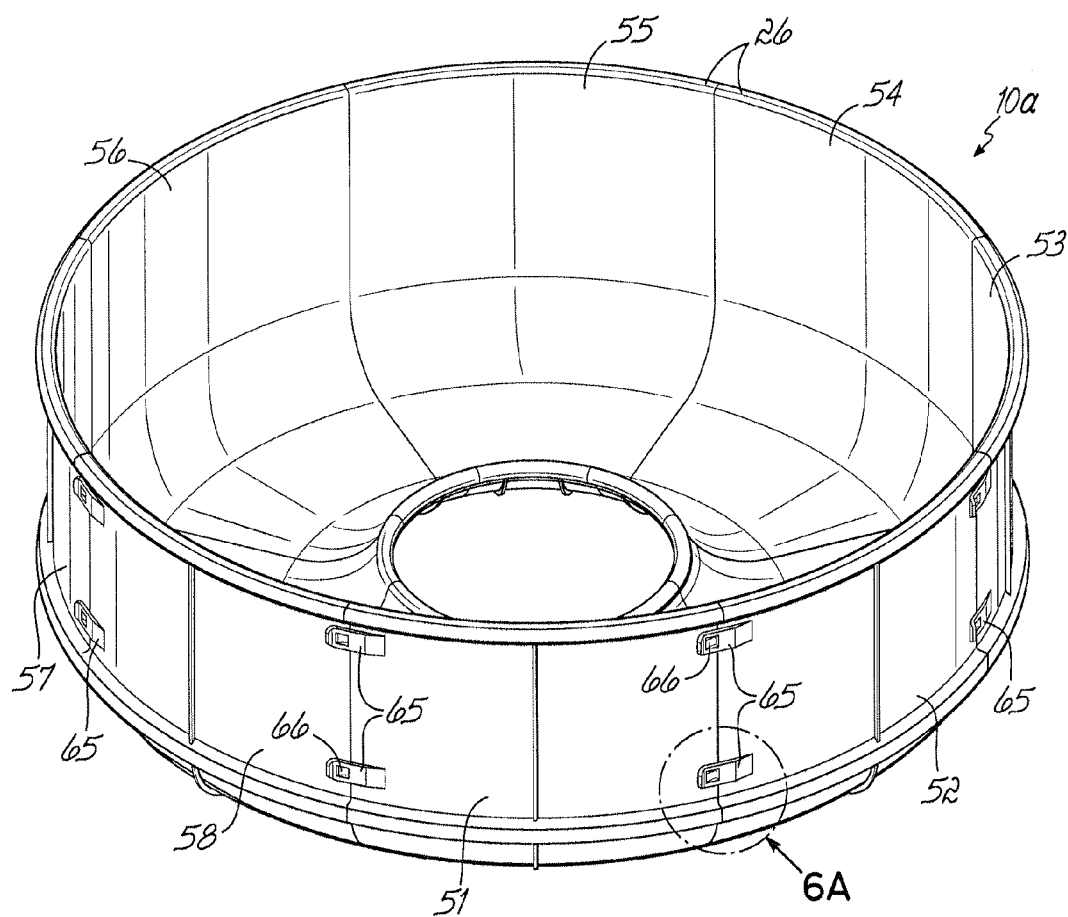
FIG. 6 is an isometric view of an alternative embodiment of the invention.
Figure 6A:
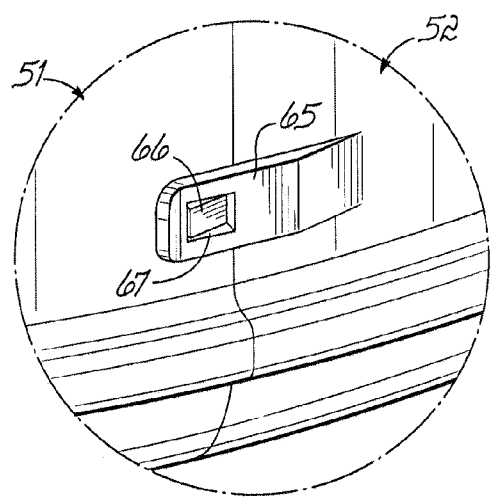
FIG. 6A is an enlarged view of the encircled area 6A of FIG. 6.

Turning now to FIGS. 6-8, there is illustrated therein features of an alternative embodiment of the invention wherein the alternative provides the same features of the embodiments of FIGS. 1-5 excepting the detail of how the segments are connected together to form the bowl, 10a.

In FIG. 6, there is shown a segmented floss bowl 10a comprising a plurality of tapered segments 51-58 essentially like bowl 10 and segments 16-23 of FIGS. 1-5. However, the segments are connected and latched together in a different way than in FIGS. 1-5.

More particularly, the edges of respective segments 51-58 are provided with projections 60 and projection receiving apertures 61. The fit between the projections 60 and apertures 61 is not necessarily a "press" or "friction", or "snap-together" fit as is the relation of the projections 30 and cavities 32. Thus, the projections 60 and receiving apertures 61 of this embodiment are intended to serve only as segment edge locating or positioning components to align the segment edges for fitting together. Of course, there could be a tighter fit to provide segment connection as in FIGS. 1-5.

In addition to the positioning, projections 60 and apertures 61, the respective segments 51-58 are provided with complimentary latch components 65, 65. Component 66 is merely a stud or other suitable member projecting outwardly from a surface of a segment such as segment 51. Component 65 is a yieldable tongue or latch having an aperture 67 therein for receiving the stud 66 in a yieldably latched condition.

Preferably two latch members are oriented on one side of the segments as segment 52 shown in FIG. 8, while each set of the segments such as shown at 51 in FIG. 8 has two studs 66 for respectively cooperating with the respective facing latches 65 extending from the adjacent segments 51, or so on around the bowl 10a.

In this manner, each segment is latched to an adjacent segment via the complimentary studs 66 and yieldable latch members 65, with the studs preferably snapping into the apertures 67. These studs 66 and apertures 67 are provided with complimentary engaging surfaces to establish a latch and stable connection of one segment to the other.

Alternatively, other suitable forms of latches, connectors, encircling members or any suitable latch or connector construction may be used to facilitate interconnection of segments, preferably yieldably, of one segment to another, to form a floss bowl of circular or other desired shape.

These and other alternatives, advantages and modifications will be readily apparent to those of ordinary skill in the art without departing from the scope of the invention and applicant will be limited only by the claims appended hereto

What is claimed is:

1. A floss bowl for collection of spun cotton candy floss and said bowl comprising:
   a plurality of independent bowl segments;
   each segment including an upper rim and a lower rim and being wider at said upper rim than at said lower rim;
   connector elements associated with the segments and cooperating to hold said segments in a bowl defining configuration, and
   said upper rims of said segments defining a mouth of said bowl when said segments are coupled together in said bowl defining configuration;
   said segments proximate said upper rim defining an outer bowl wall and said segments proximate said lower rim defining an inner bowl wall and an opening spaced from said mouth.

2. A bowl as in claim 1 wherein each segment comprises an upstanding outer bowl wall and an upstanding inner bowl wall, each said segment tapering from a wider width proximate an upper rim thereof to a narrower width proximate a lower rim thereof.

3. A bowl as in claim 1 wherein each segment has one edge including at least two first connector components thereon and a second opposite edge including at least two other second connector components thereon, said first connector components on one edge of a segment operationally cooperating with said second components of an opposite edge of an adjacent segment to hold said segments together to form at least a portion of the bowl.

4. A floss bowl as in claim 1 wherein said connector elements comprise respective posts and cavities oriented proximate edges of respective bowl segments.

5. A floss bowl as in claim 1 wherein said connector elements comprise respective studs and stud engaging yieldable latch members oriented at edges of respective bowl segments.

6. A floss bowl as in claim 1 wherein said connector elements comprise means for connecting respective bowl segments edge-to-edge in a bowl configuration.

7. A floss bowl as in claim 1 wherein each segment extends from one segment width proximate said upper rim to a lesser segment width proximate to said lower rim.

8. A floss bowl as in claim 1 wherein said segments, when coupled together define a circular bowl having a curved bottom.

9. A floss bowl as in claim 8 wherein each segment has a curved configuration with one segment nestleable within and adjacent one another.

10. A method of making a cotton candy bowl including:
   making a plurality of segments, each segment being operably connectable to at least one other segment;
   nesting said segments together prior to any assembly or connection of said segments together to form said bowl;
   connecting said segments together to form a bowl having an outer side wall extending upwardly to a bowl mouth and an inner wall, each segment including an upper rim defining said bowl mouth and a lower rim proximate said inner wall; and
   orienting said bowl on a base of a cotton candy machine.

\* \* \* \* \*